Oct. 9, 1962

R. MEES 3,057,530

LOOP SETTER FOR PROJECTORS

Filed Oct. 14, 1960

INVENTOR
ROBERT MEES

BY Toulmin & Toulmin

ATTORNEYS

United States Patent Office 3,057,530
Patented Oct. 9, 1962

3,057,530
LOOP SETTER FOR PROJECTORS
Robert Mees, Wissmar, Wetzlar, Germany, assignor to Ernst Leitz Gesellschaft mit beschränkter Haftung, Wetzlar, Germany
Filed Oct. 14, 1960, Ser. No. 62,637
Claims priority, application Germany Oct. 17, 1959
6 Claims. (Cl. 226—91)

The present invention relates to projectors. More in particular, the present invention relates to an improvement in loop setting film guide means in motion picture projectors.

Cinematographic or motion picture projectors having structure for automatic threading of the film strip have been previously constructed. These projectors generally have loop setting means for deflecting the film strip during its travel between the upper sprocket wheel and the film guide plate, and between the latter and the lower sprocket wheel. The loop setting means usually comprise an upper and a lower guide member both of which are pivotally mounted to assume a closed and an opened position relative to one another.

In the closed position, only a small gap is formed between the two guide members so that automatic threading of the film strip can be achieved by forcing the strip in the proper direction along the film guide plate. The threading of the film strip must therefore be effected when the loop setter is in the closed position.

In general, one of the guide members is so formed to push back the film guide plate when the loop setting means is in the closed or film threading position. Thus, a wedge-shaped gap is formed between the film guide plate and a stationary plate positioned in front of the guide plate. This gap facilitates the entry of the film strip between the two plates.

In the open position, which is the operating position once the threading has been effected, the guide members are spaced from one another to a greater extent so that the film strip is not in a contact guiding relationship with either of them. Consequently, the guide effect necessary for the threading operation is absent. If a threading is inadvertently initiated in this opened position of the loop setter, the film strip will not be guided along the film guide plate. The strip end is prevented from further movement either by one of the guide members or by a portion of the guide plate itself, and, as the pay-out spool continues to pay out additional film, a disorderly coil of film will accumulate in the vicinity of the loop setter and the guide plate. As a result, the film strip is only difficultly recovered and may even be damaged or destroyed.

To eliminate the above disadvantages, the present invention provides loop setting means in a cinematographic projector wherein the film guide plate will deflect the film when the film is threaded into guide members in the open position. As a result, there will be an easy recovery of the film strip since the strip is led out of the area of the guide members forming the loop setter and the film guide plate.

This invention essentially comprises a loop setting means wherein the loop setter is formed of first and second guide members which are associated with a sprocket wheel receiving a film strip from a pay-out spool. The guide members extend in the direction of travel of the film strip from the sprocket wheel, and point towards the film guide plate. Both of the guide members are pivotally mounted so that either can be pivoted towards and away from the other guide member, thereby assuming an opened position and a closed position of the loop setter. In addition, one of the guide members has a concave portion adjacent the sprocket, and a convex portion adjacent the concave portion. The concave portion has such a curvature, that, in the opened position of the loop setter, the film strip contacts the surface of the concave portion at an angle $\alpha < 90°$. The convex portion has such a curvature that the film strip contacts the film guide plate at an angle $\beta < 90°$. Due to this arrangement the film strip is deflected away from the area of the loop setter and the film guide plate, and the foremost end is led out of the projector and can be easily recovered.

According to a further advantageous feature of the invention the end portion of the film guide plate adjacent the afore-mentioned guide members is bent away from the latter.

It is therefore the principal object of this invention to provide a novel and improved loop setting means for a motion picture projector wherein the film will be deflected out of the projector if the film is threaded when the guide members are open.

The invention will be more fully appreciated upon reference to the accompanying description and the following drawings, wherein FIGURE 1 is a side elevational view of a projector with the loop setter according to the invention, with the loop setter shown in its closed position;

Figure 1:
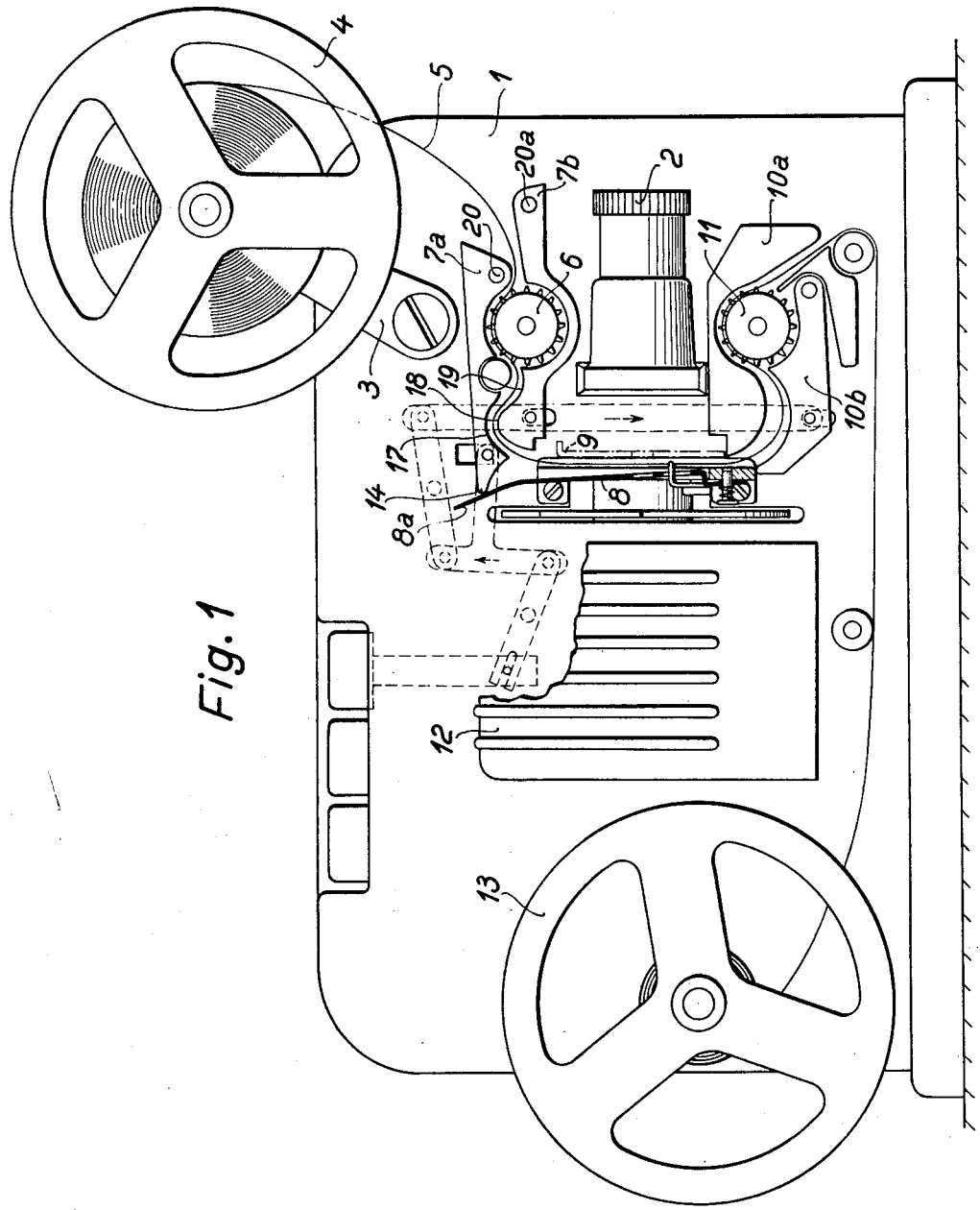
Figure 2:
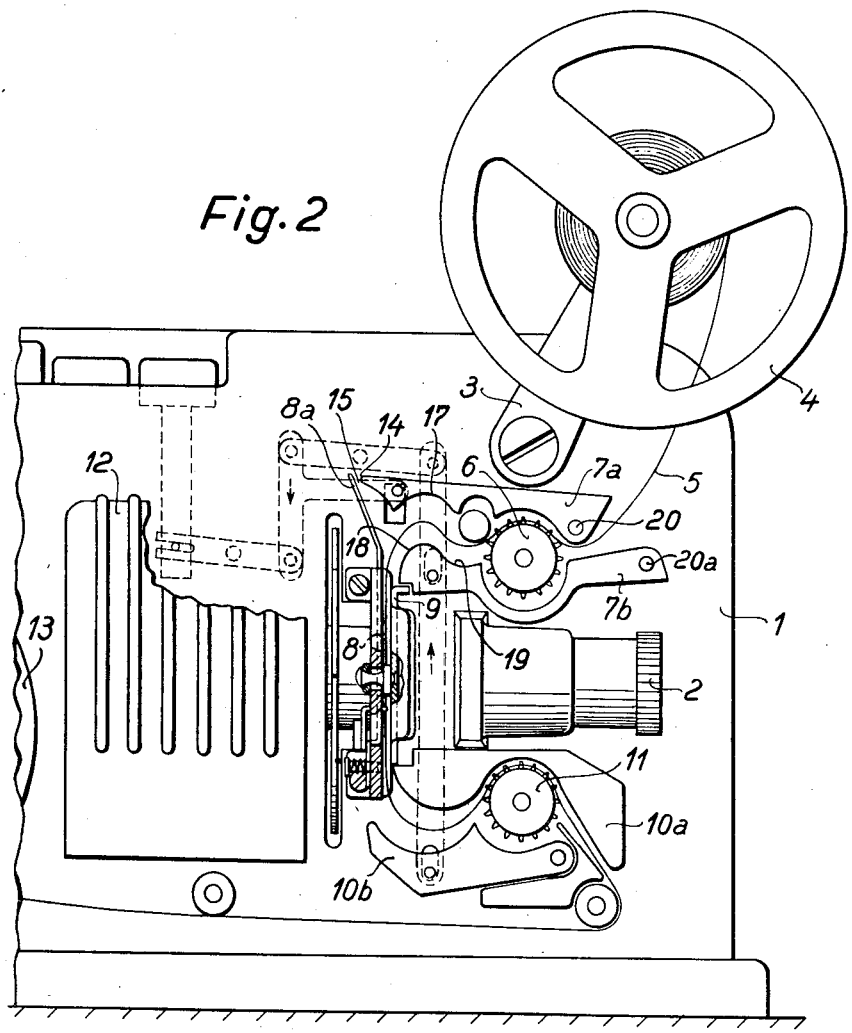
FIGURE 2 is the same view as FIGURE 1, but with the loop setter in its opened position.

Describing the invention in greater detail, FIGURES 1 and 2 show a projector having a casing 1, on which is mounted an objective 2, and a support 3 for a pay-out spool 4 on which latter a film strip 5 is stored. For conveying the film strip 5, the projector comprises a first, upper sprocket wheel 6, and a second, lower sprocket wheel 11. A first loop setter is associated with sprocket wheel 6, consisting of an upper guide member 7a and a lower guide member 7b, both of which are pivotally mounted. A second loop setter is associated with the lower sprocket wheel 11, consisting of an upper guide member 10a which is stationary and a lower guide member 10b which is pivotally mounted.

The projector casing further supports substantially in its middle portion a vertically extending film guide plate 8 in front of which is disposed another plate 9. Both plates 8 and 9 have image apertures which are not shown in the drawings. A lamp casing 12 is provided behind the film guide plate 8. The take-up spool is indicated at 13.

The present invention is essentially concerned with the structure of the upper loop setter consisting of the guide members 7a and 7b, and with the configuration of the guide plate 8, which will next be described.

The upper guide member 7a has a concave portion 17 matching with a corresponding convex portion 18 of the lower guide member 7b. Furthermore, the lower guide member 7b has a concave portion 19 immediately adjacent portion 18 in the direction from which film strip 5 travels, as conveyed by sprocket wheel 6. The upper guide member 7a is pivotally mounted at 20. The lower guide member 7b is pivotally mounted at 20a. Both guide members 7a and 7b are pivoted at their ends opposite to the end of the guide member 7a having the concave portion 17, so that the loop setter may assume an opened position, shown in FIGURES 2 and 3, and a closed position, shown in FIGURE 1.

According to a further advantageous feature of the invention the film guide plate 8 has a bent portion 8a at the end adjacent the upper guide member 7a. This portion is bent away from the direction of travel of film strip 5 between guide members 7a and 7b.

The operation of the above-described structure of the invention is as follows: The accurate threading of the film strip is effected in the closed position of the loop setter, as illustrated in FIGURE 1. The film strip is gripped in its perforations by the sprocket wheel 6 and is conveyed by the latter between the guide members 7a, 7b, forming the loop setter. Due to the concave portion 17 of the upper guide member and the corresponding convex portion 18 of the lower guide member a loop is formed, so that the film strip is deflected towards the film guide plate 8, along which it travels onto the lower loop setter formed by guide members 10a, 10b, whereafter it is conveyed further by the lower sprocket wheel 11.

Figure 3:
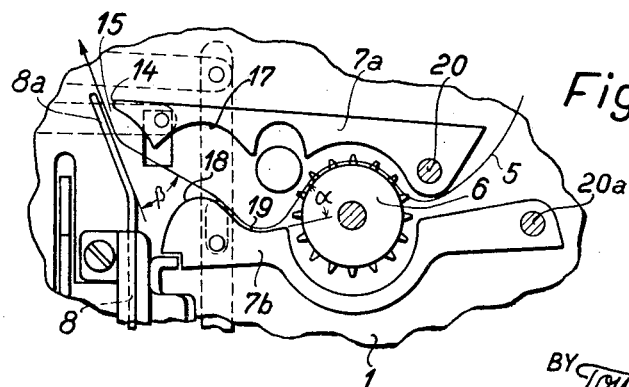
FIGURE 3 is a partial, enlarged view illustrating the loop setter in its opened position and the path of travel of a film strip.

If the film strip is erroneously threaded with the upper loop setter, formed by the guide members 7a, 7b, in the opened position, illustrated in FIGURES 2 and 3, the strip 5 is conveyed by sprocket wheel 6 onto the concave portion 19 of the lower guide member 7b; the curvature of the concave portion 19 is so constructed that the film strip 5 reaches the surface of the concave portion 19 at an angle $\alpha < 90°$. Consequently, further movement of the film strip is not impeded but the film strip is deflected to travel between the convex portion 18 and the concave portion 17. The curvature of the convex portion 18 is so designed that it directs the film strip reaching its surface against the bent portion 8a of film guide plate 8 in such a manner, that the film strip, when first contacting the portion 8a, forms with the latter an angle $\beta < 90°$. As a result, the film strip is deflected upwardly, i.e. in a direction opposite to its usual direction of travel which is along guide plate 8 in case of accurate threading.

It will be seen from FIGURE 3 that the length and position of the upper guide member 7a are so constructed that in its opened position its end 14, adjacent the film guide plate bent portion 8a, is sufficiently removed from the latter, so that a gap 15 is formed, through which the film strip is allowed to travel. Thus it will be seen that the loop setting guide means of the invention render an inaccurate threading of the film strip entirely harmless.

It will be understood that this invention is susceptible to modification in order to adapt it to different usages and conditions and, accordingly, it is desired to comprehend such modifications within this invention as may fall within the scope of the appended claims.

What I claim is:

1. In a projector, a sprocket wheel receiving a film strip from a pay-out spool, loop setting guide means cooperating with said sprocket wheel and comprising an upper guide member and a lower guide member extending in the direction of travel of the film strip from said sprocket wheel, a film guide plate adjacent said guide members in the direction of travel of the film strip, the end portion of said film guide plate adjacent said guide members being bent away from said guide members, both said upper and said lower guide members being pivotally mounted at their ends further from said film guide plate so that each guide member is pivotable towards and away from the other to define closed and opened positions for said guide means, both of said guide members having substantially matching opposing surfaces, the surface of one of said guide members having a concave portion adjacent said sprocket wheel and a convex portion adjacent said concave portion, said concave portion having such curvature that when in said opened position the film strip contacts said concave member at an angle $\alpha < 90°$, said convex portion having such a curvature that the film strip contacts said film guide plate at an angle $\beta < 90°$.

2. In a projector according to claim 1, with said upper guide member and said bent portion of said film guide plate defining, in said opened position, a gap through which the film strip is deflected after having contacted said bent portion of said film guide plate.

3. In a projector, a sprocket wheel receiving a film strip from a pay-out spool, loop setting guide means cooperating with said sprocket wheel and comprising an upper guide member and a lower guide member extending in the direction of travel of the film strip from said sprocket wheel, a film guide plate adjacent said guide members in the direction of travel of the film strip, the end portion of said film guide plate adjacent said guide members being bent away from said guide members, said upper guide member being pivotably mounted at its end opposite the end adjacent said film guide plate so as to be pivotable towards and away from the other one of said guide members, thereby defining closed and opened positions, respectively, for said guide means, one of said guide members having a concave portion adjacent said sprocket wheel and a convex portion adjacent said concave portion, said concave portion having such curvature that when in said opened position the film strip contacts said concave member at an angle $\alpha < 90°$, said convex portion having such a curvature that the film strip contacts said film guide plate at an angle $\beta < 90°$, thereby guiding said film strip out of the projector intermediate the end portion of said film guide plate and the free end of said upper guide member.

4. In a projector according to claim 3, with said upper guide member and said bent portion of said film guide plate defining, in said opened position, a gap through which the film strip is deflected after having contacted said bent portion of said film guide plate.

5. In a projector, a sprocket wheel receiving a film strip from a pay-out spool, loop setting guide means cooperating with said sprocket wheel and comprising an upper guide member and a lower guide member extending in the direction of travel of the film strip from said sprocket wheel, a film guide plate adjacent said guide members in the direction of travel of the film strip, the end portion of said film guide plate adjacent said guide members being bent away from said guide members, said lower guide member being pivotally mounted at its end opposite the end adjacent said film guide plate so as to be pivotable toward and away from the other of said guide members to define closed and opened positions for said guide means, one of said guide members having a concave portion adjacent said sprocket wheel and a convex portion adjacent said concave portion, said concave portion having such curvature that when in said open position the film strip contacts said concave member at an angle $\alpha < 90°$, said convex portion having such a curvature that the film strip contacts said film guide plate at an angle $\beta < 90°$.

6. In a projector, a sprocket wheel receiving a film strip from a pay-out spool, loop setting guide means cooperating with said sprocket wheel and comprising an upper guide member and a lower guide member extending in the direction of travel of the film strip from said sprocket wheel, a film guide plate adjacent said guide members in the direction of travel of the film strip, the end portion of said film guide plate adjacent said guide members being bent away from said guide members, one of said guide members being pivotally mounted at its end opposite the end adjacent said film guide plate so as to be pivotable toward and away from the other one of said guide members to define closed and opened positions for said guide means, one of said guide members having a concave portion adjacent said sprocket wheel and a convex portion adjacent said concave portion, said concave portion having such a curvature that when in said opened position the film strip contacts said concave member at an angle $\alpha < 90°$, said convex portion having such a curvature that the film strip contacts said film guide plate at an angle $\beta < 90°$.

References Cited in the file of this patent

UNITED STATES PATENTS

| | | |
|---|---|---|
| 2,420,587 | Dietrich | May 13, 1947 |
| 2,983,416 | Hanken et al. | May 9, 1961 |